US012683139B2

(12) United States Patent
Bloomfield et al.

(10) Patent No.: US 12,683,139 B2
(45) Date of Patent: Jul. 14, 2026

(54) SYSTEMS AND METHODS FOR CHARGE STATE ASSIGNMENT IN MASS SPECTROMETRY

(71) Applicant: DH TECHNOLOGIES DEVELOPMENT PTE. LTD., Singapore (SG)

(72) Inventors: Nic Bloomfield, Newmarket (CA); Gordana Ivosev, Etobicoke (CA); Pavel Ryumin, Toronto (CA)

(73) Assignee: DH Technologies Development Pte. Ltd., Singapore (SG)

( * ) Notice: Subject to any disclaimer, the term of this patent is extended or adjusted under 35 U.S.C. 154(b) by 664 days.

(21) Appl. No.: 18/040,774

(22) PCT Filed: Aug. 6, 2021

(86) PCT No.: PCT/IB2021/000551
§ 371 (c)(1),
(2) Date: Feb. 6, 2023

(87) PCT Pub. No.: WO2022/029500
PCT Pub. Date: Feb. 10, 2022

(65) Prior Publication Data

US 2023/0282469 A1 Sep. 7, 2023

Related U.S. Application Data

(60) Provisional application No. 63/062,231, filed on Aug. 6, 2020.

(51) Int. Cl.
*H01J 49/00* (2006.01)
*H01J 49/02* (2006.01)

(52) U.S. Cl.
CPC ........ *H01J 49/0036* (2013.01); *H01J 49/025* (2013.01)

(58) Field of Classification Search
CPC ............................ H01J 49/0036; H01J 49/025
(Continued)

(56) References Cited

U.S. PATENT DOCUMENTS 5,073,713 A 12/1991 Smith et al.
9,159,538 B1 10/2015 McClure
(Continued)

FOREIGN PATENT DOCUMENTS

CN 1515020 A 7/2004
CN 105264638 A 1/2016
(Continued)

OTHER PUBLICATIONS

Wehofsky, et al ("Automated deconvolution and deisotoping of electrospray mass spectra," J. Mass Spectrom., vol. 37, Jan. 1, 2002, pp. 223-229) (Year: 2002).*
(Continued)

*Primary Examiner* — Michael Maskell
(74) *Attorney, Agent, or Firm* — Merchant & Gould P.C.

(57) ABSTRACT

A method for assigning charge state in mass spectrometry includes receiving a detector response signal corresponding to a plurality of ion arrival events. The detector response signal includes information related to individual ion responses generated by a detector for each ion arrival event. Detector response profiles are generated for mass-to-charge (m/z) bins of a mass spectrum generated from the ion arrival events based on the detector response signal. The m/z bins are grouped into a plurality of groups based on a similarity of the detector response profiles of the m/z bins. A charge state is assigned to one or more features based on the groups of m/z bins.

20 Claims, 14 Drawing Sheets

(58) Field of Classification Search
USPC .................................................. 250/281, 282
See application file for complete search history.

(56) References Cited

U.S. PATENT DOCUMENTS

| | | | | |
|---|---|---|---|---|
| 2004/0169137 | A1 | 9/2004 | Westphall | |
| 2005/0012512 | A1 | 1/2005 | Kolachina et al. | |
| 2005/0263693 | A1 | 12/2005 | Vachet et al. | |
| 2013/0274143 | A1* | 10/2013 | Emanuele, II ...... | H01J 49/0036 702/19 |
| 2015/0069254 | A1 | 3/2015 | Fernandez | |
| 2016/0035548 | A1 | 2/2016 | Brown et al. | |
| 2016/0268112 | A1 | 9/2016 | Yip et al. | |
| 2018/0005809 | A1 | 1/2018 | Roukes | |
| 2018/0301326 | A1 | 10/2018 | Bern | |
| 2018/0340827 | A1 | 11/2018 | Yamada | |
| 2023/0298876 | A1* | 9/2023 | Bloomfield ......... | H01J 49/0036 250/282 |
| 2023/0335384 | A1 | 10/2023 | Ryumin | |
| 2024/0355605 | A1 | 10/2024 | Le Blanc | |
| 2026/0045467 | A1 | 2/2026 | Ryumin | |

FOREIGN PATENT DOCUMENTS

| | | | |
|---|---|---|---|
| DE | 10 2010 006450 | | 8/2011 |
| EP | 2458619 | A | 5/2012 |
| EP | 2741223 | A1 | 6/2014 |
| GB | 2524357 | | 9/2015 |
| JP | Sho 48-017389 | A | 3/1973 |
| JP | 2004-508566 | A | 3/2004 |
| JP | 2007-500931 | A | 1/2007 |
| JP | 2008-249444 | A | 10/2008 |
| JP | 2015056262 | A | 3/2015 |
| JP | 2016-513796 | A | 5/2016 |
| JP | 2017-531802 | A | 10/2017 |
| JP | 2021-527300 | A | 10/2021 |
| WO | 2006/120928 | | 11/2006 |
| WO | 2015/173577 | | 11/2015 |
| WO | 2015/191993 | | 12/2015 |
| WO | 2019/060538 | | 3/2019 |
| WO | 2019/142068 | | 7/2019 |
| WO | 2019/197983 | | 10/2019 |
| WO | 2019/236141 | | 12/2019 |
| WO | 2020/109091 | | 6/2020 |
| WO | 2020/157720 | | 8/2020 |

OTHER PUBLICATIONS

Contino, Nathan C. et al., “Charge Detection Mass Spectometry with Resolved Charge States”, Journal of the American Society for Mass Spectometry, vol. 24, No. 1, Nov. 30, 2012, pp. 101-108.
Kafader, Jared O. et al., “Multiplexed Mass Spectometry of Individual Ions Improves Measurement of Proteoforms and Their Complexes”, Nature Methods, Nature Pub. Group, NY, vol. 17, No. 4, Mar. 2, 2020, pp. 391-394.
Kolakowski, Beata et al., “Review of applications of high-field asymmetric waveform ion mobility spectrometry (FAIMS) and differential mobility spectrometry (DMS)”, The Analyst, vol. 132, No. 9, Jun. 26, 2007, pp. 842-864.
Hofstadler, Steven A. et al., “Selective Ion Filtering by Digital Thresholding: A Method to Unwind Complex ESI-Mass Spectra and Eliminate Signals from Low Molecular Weight Chemical Noise”, Analytical Chemistry, vol. 78, No. 2, Jan. 1, 2006, pp. 372-378.
Kafader et al., “Measurement of Individual Ions Sharply Increases the Resolution of Orbitrap Mass Spectra of Proteins”, Analytical Chemistry 2019, 91, 4, pp. 2776-2783.
Kafader et al., “STORI Plots Enable Accurate Tracking of Individual Ion Signals”, J Am Soc Mass Spectrom. 2019, 11, pp. 2200-2203.
Marty, Michael, et al., “Bayesian Deconvolution of Mass and Ion Mobility Spectra: From Binary Interactions to Polydisperse Ensembles”, Anal. Chem. 2015, 87, 8, 4370-4376.
PCT International Preliminary Report on Patentability in International Application PCT/IB2021/000551, mailed Feb. 16, 2023, 11 pages.
PCT International Preliminary Reporton Patentability in International Application PCT/IB2021/000514, mailed Feb. 16, 2023, 8 pages.
PCT International Search Report and Written Opinion in International Application PCT/IB2021/000514, mailed Nov. 26, 2021, 11 pages.
PCT International Search Report and Written Opinion in International Application PCT/IB2021/000551, mailed Dec. 23, 2021, 14 pages.
Pierson, Elizabeth et al., “Charge Detection Mass Spectomoetry for Single Ions with an Unceratinty in the Charge Measurement of 0.65 e”, Journal of the American Society for Mass Spectometry, Elsevier Science, vol. 26, No. 7, Apr. 14, 2015, pp. 1213-1220.
Wehofsky, M. et al., “Automated deconvolution and deistoping of electrospray mass spectra”, Journal of Mass Spectometry, vol. 37, Jan. 1, 2002, pp. 223-229.
European Communication pursuant to Article 94(3) EPC in U.S. Appl. No. 21/765,695, mailed Apr. 16, 2026, 7 pages.
European Communication pursuant to Article 94(3) EPC in U.S. Appl. No. 21/778,559, mailed Apr. 21, 2026, 7 pages.

* cited by examiner

150

SYSTEMS AND METHODS FOR CHARGE STATE ASSIGNMENT IN MASS SPECTROMETRY

CROSS-REFERENCE TO RELATED CASES

This application is a National Stage Application of PCT International Patent Application No. PCT/IB2021/000551, filed Aug. 6, 2021, which claims the benefit of priority to U.S. Patent Application Ser. No. 63/062,231, filed Aug. 6, 2020 the contents of which are incorporated herein by reference in their entireties. To the extent appropriate, a claim of priority is made to each of the above disclosed applications.

BACKGROUND

As a general overview, mass spectrometry (MS) is an analytical technique for the detection and quantitation of chemical compounds based on the analysis of mass-to-charge (m/z) values of ions formed from those compounds. MS involves ionization of one or more compounds of interest from a sample, producing precursor ions, and mass analysis of the precursor ions. Tandem mass spectrometry or mass spectrometry/mass spectrometry (MS/MS) involves ionization of one or more compounds of interest from a sample, selection of one or more precursor ions of the one or more compounds, fragmentation of the one or more precursor ions into product ions, and mass analysis of the product ions.

Both MS and MS/MS can provide qualitative and quantitative information. The measured precursor or product ion spectrum can be used to identify a molecule of interest. The intensities of precursor ions and product ions can also be used to quantitate the amount of the compound present in a sample.

Mass spectrometry techniques often generate mass spectrum data utilizing a mass-to-charge ratio (m/z) for detected ions. Knowledge of the actual charge or mass of the detected ions, however, is often not directly measurable. As a result, some overlap of detected ions may occur in certain scenarios. For example, a singularly charged ion with a mass may appear in the mass spectrum as having the same mass-to-charge ratio as a doubly charged ion with double the mass. This issue may generally be referred to as a peak overlapping problem.

In top-down mass spectrometry (MS) protein analysis, for example, overlapping of mass or mass-to-charge (m/z) peaks in a mass spectrum is a significant problem. In this type of analysis, a very wide range of different fragment or product ions are produced, including product ions that have lengths of 1-200 amino acids and have 1-50 different charge states. The product ion peaks are heavily overlapped with each other in a single spectrum. In addition, the overlap can be so extensive that even mass spectrometers with the highest mass resolution (Fourier transform ion cyclotron resonance (FT-ICR) or orbitrap) cannot deconvolve such overlapped peaks. As a result, large product ions are often lost in top-down protein analysis, limiting the sequence coverage of large proteins. International Publication WO2020/157720 (the '720 Publication), published on Aug. 6, 2020, and International Publication WO2019/197983, published on Oct. 17, 2019, both provide additional discussion of a top-down MS protein analysis and associated challenges.

SUMMARY

In one aspect, the technology relates to a method for assigning charge state in mass spectrometry, the method including: receiving a detector response signal corresponding to a plurality of ion arrival events, the detector response signal includes information related to individual ion responses generated by a detector for each ion arrival event; based on the detector response signal, generating detector response profiles for mass-to-charge (m/z) bins of a mass spectrum generated from the ion arrival events; grouping the m/z bins into a plurality of groups based on a similarity of the detector response profiles of the m/z bins; and assigning a charge state to one or more features based on the groups of m/z bins. In an example, the method further includes generating a simplified mass spectra based on the groups of m/z bins, wherein the groups of m/z bins are indicated in the simplified mass spectra. In another example, the method further includes calculating a mass corresponding to the ion arrival events based on the assigned charge state. In yet another example, grouping the m/z bins is further based on additional separation domain data. In still another example, the additional separation domain data includes at least one of retention time, drift time, or compensation voltage for ion mobility.

In another example of the above aspect, grouping the m/z bins is performed using a principal component analysis (PCA), a k-means clustering algorithm, or a principal component variable grouping (PCVG) algorithm. In an example, the method further includes generating a representation of the ion arrival events, the representation having an m/z dimension, a detector response dimension, and an ion count or probability dimension. In another example, the representation is a heatmap. In yet another example, grouping the m/z bins is performed, at least in part, by applying a pattern recognition algorithm to the representation.

In another aspect, the technology relates to a system for assigning charge state in mass spectrometry, the system including: a detector to configured to generate a detector response signal for each ion arrival event; a processor; and a memory storing instructions that are configured to, when executed by the processor, cause the system to perform a set of operations including: receiving, from the detector, the detector response signal corresponding to a plurality of ion arrival events, the detector response signal includes information related to individual ion responses generated by the detector for each ion arrival event; based on the detector response signal, generating detector response profiles for mass-to-charge (m/z) bins of a mass spectrum generated from the ion arrival events; grouping the m/z bins into a plurality of groups based on a similarity of the detector response profiles of the m/z bins; and assigning a charge state to one or more features based on the groups of m/z bins. In an example, the operations further include generating a simplified mass spectra based on the groups of m/z bins, wherein the groups of m/z bins are indicated in the simplified mass spectra. In another example, grouping the m/z bins is further based on additional separation domain data. In yet another example, the additional separation domain data includes at least one of retention time, drift time, or compensation voltage for ion mobility. In still another example, grouping the m/z bins is performed using a principal component analysis (PCA), a k-means clustering algorithm, or a principal component variable grouping (PCVG) algorithm.

In another example of the above aspect, the system further includes generating a representation of the ion arrival events, the representation having an m/z dimension, a detector response dimension, and an ion count or probability dimension. In an example, the system further includes generating confidence scores for the groups, and wherein assigning the charge state is further based on at least one of the confidence scores.

In another aspect, the technology relates to a method for assigning charge state in mass spectrometry, the method including: receiving a detector response signal corresponding to a plurality of ion arrival events, the detector response signal includes information related to individual ion responses generated by a detector for each ion arrival event; based on the detector response signal, generating detector response profiles for mass-to-charge (m/z) bins of a mass spectrum generated from the ion arrival events; grouping the m/z bins into a plurality of groups based on a similarity of the detector response profiles of the m/z bins; identifying m/z bins that represent single-ion arrival events; and assigning a charge state to one or more features based on the groups of m/z bins identified as having single-ion arrival events. In an example, the method further includes generating confidence scores for the groups, and wherein assigning the charge state is further based on at least one of the confidence scores. In another example, grouping the m/z bins is further based on additional separation domain data including at least one of retention time, drift time, or compensation voltage for ion mobility. In yet another example, identifying the m/z bins that represent single-ion arrival events is based on a frequency of observed detection events in the m/z bin.

In another aspect, the technology relates to a method for analyzing data in mass spectrometry, the method including: receiving a detector response signal corresponding to a plurality of ion arrival events, the detector response signal includes information related to individual ion responses generated by a detector for each ion arrival event; based on the detector response signal, generating data representation consisting of at least detector response profiles and mass-to-charge (m/z) bins of a mass spectrum generated from the ion arrival events; and utilizing the data representation for at least one of compound identification and specie identification. In an example, compound identification includes compound quantitation. In another example, compound identification includes assigning a charge to at least one detected group of ions. In yet another example, assigning a charge is based at least in part on the detector response profiles. In still another example, the method further includes simplifying the data representation.

In another example of the above aspect, the simplified data representation includes at least one or higher rank tensor data. In an example, simplifying the data representation includes generating of one or more spectra in an m/z domain. In another example, simplifying the data representation includes generating of one or more spectra in a mass domain. In yet another example, simplifying the data representation is based at least in part on the detector response profiles. In still another example, simplifying the data representation includes grouping the m/z bins with similar detector response profiles.

In another example of the above aspect, the method further includes calculating a mass corresponding to the ion arrival events based on an assigned charge state. In an example, simplifying the data representation is based on an additional separation domain data. In another example, the additional separation domain data includes at least one of a retention time, a drift time, and a compensation voltage for ion mobility. In yet another example, simplifying the data representation is performed at least in part by using a multivariate analysis. In still another example, simplifying the data representation is performed based at least in part by applying a nonnegative factorisation algorithm.

In another example of the above aspect, the multivariate analysis includes at least one of a principal component analysis (PCA), a k-means clustering algorithm, a t-SNE algorithm and a principal component variable grouping (PCVG) algorithm. In an example, simplifying the data representation is performed based at least in part using pattern recognition or machine learning. In another example, simplifying the data representation is performed at least in part using statistical methods for matching observed detector responses to a catalogue of predetermined detector response distributions. In yet another example, the catalogue is generated a priori. In still another example, the catalogue is generated from the simplified data representation.

In another example of the above aspect, the compound identification or the specie identification includes generating a compound library or a specie library and matching a compound or specie with the library with an algorithm. In an example, the detection system is one of electron-multiplier based detection system or image-charge based detection system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

As briefly discussed above, peak overlapping of detected ions is problematic for analysis of MS results, and discriminating between mass signals generated for ions having similar mass-to-charge (m/z) can be a difficult problem in mass spectrometry. For compound identification, mass spectra are usually converted into a list of monoisotopic masses corresponding to different compounds. To find such masses the following strategy is often employed: first, each peak in the mass spectrum is assigned to a corresponding isotopic cluster with a certain charge state. Following this, the lowest m/z peak is found for each cluster, which is the peak corresponding to the monoisotopic mass. Knowing the cluster charges the monoisotopic peaks of each cluster can be converted to a zero-charge list of monoisotopic masses, which then can be used in subsequent algorithms attributing mass spectral peaks to chemical compounds. Alternatively, instead of monoisotopic m/z an average m/z of the isotopic cluster and its corresponding charge state could be used similarly. This method has an advantage if certain peaks from the isotopic cluster are below the detection limit, specifically if monoisotopic m/z is below detection limit. Practically, correct charge state assignment to a feature (isotopic cluster) in the mass spectrum may be a key step towards compound identification.

Figure 4:
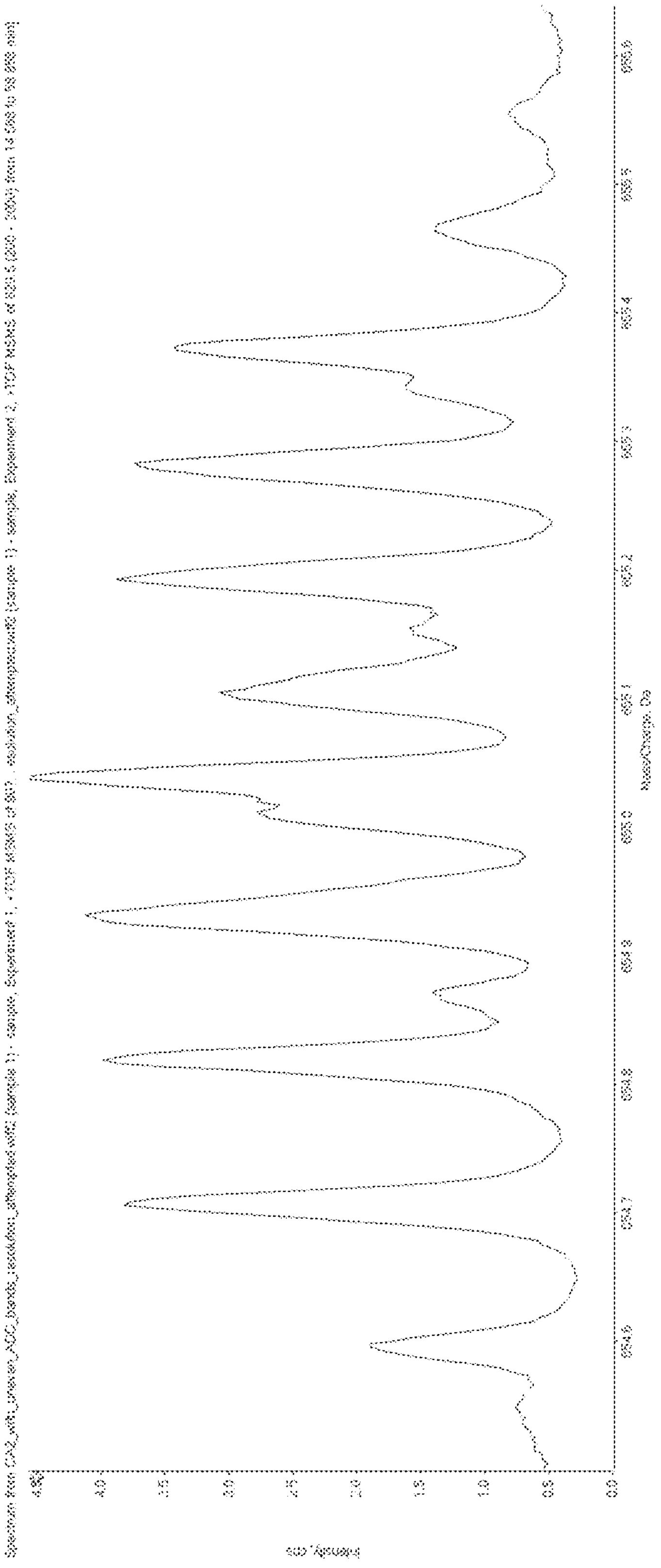
FIG. 4 depicts example spectra with overlapping features.

Conventionally, charge deconvolution algorithms in the m/z domain are used for charge state identification. However, if there is a severe spectral overlap, which includes inter-digitated peaks and peak overlapping, this approach is challenging. This is often the case for complex spectra of mixtures or product ion spectra of large biopolymers, such as top-down analysis spectra. FIG. 4 depicts an example plot illustrating an example of multiple overlapping features in an ECD top-down spectrum of carbonic anhydrase 2 (CA2), where conventional algorithms are prone to errors.

It has been recognized that the detection response for both electron-multiplier or image-charge detection systems can be proportional to the charge state of the measured ion (See, e.g., the discussion of references in the '720 Publication, which is hereby incorporated herein by reference in its entirety). Therefore, in theory the charge state can be determined upon careful investigation of such intensities. Interestingly, few attempts have been made to exploit the phenomena for charge state inference. This is because it is challenging technologically.

First, detection events from multiple acquisitions are conventionally summed into a single spectrum to compress the data. Such compression however prevents any further analysis of detector responses of each individual ion events rendering it impossible to infer the charge state. A complete record of each ion detection event intensity and its mass spectral feature, e.g. time of flight or oscillation frequency, is therefore preferred for such analysis. Alternative data compression strategies can also be utilized for retaining some information of individual detector responses while still maintaining data compression. For example, each detection event can be co-added to a multiple spectra forming detector response bands similar to the approach described in the '720 Publication.

Second, multiple co-detected ions can generate a detector response, which is substantially a sum of the detector responses generated by each co-arriving ion. It is therefore not always possible to infer the charge state of the ions using only the detector response intensity of the detected signal. In general, sufficiently low ion flux is preferred for charge state determination using detector response, such that of the number of detection events with co-arriving ions is minimized.

Figure 5:
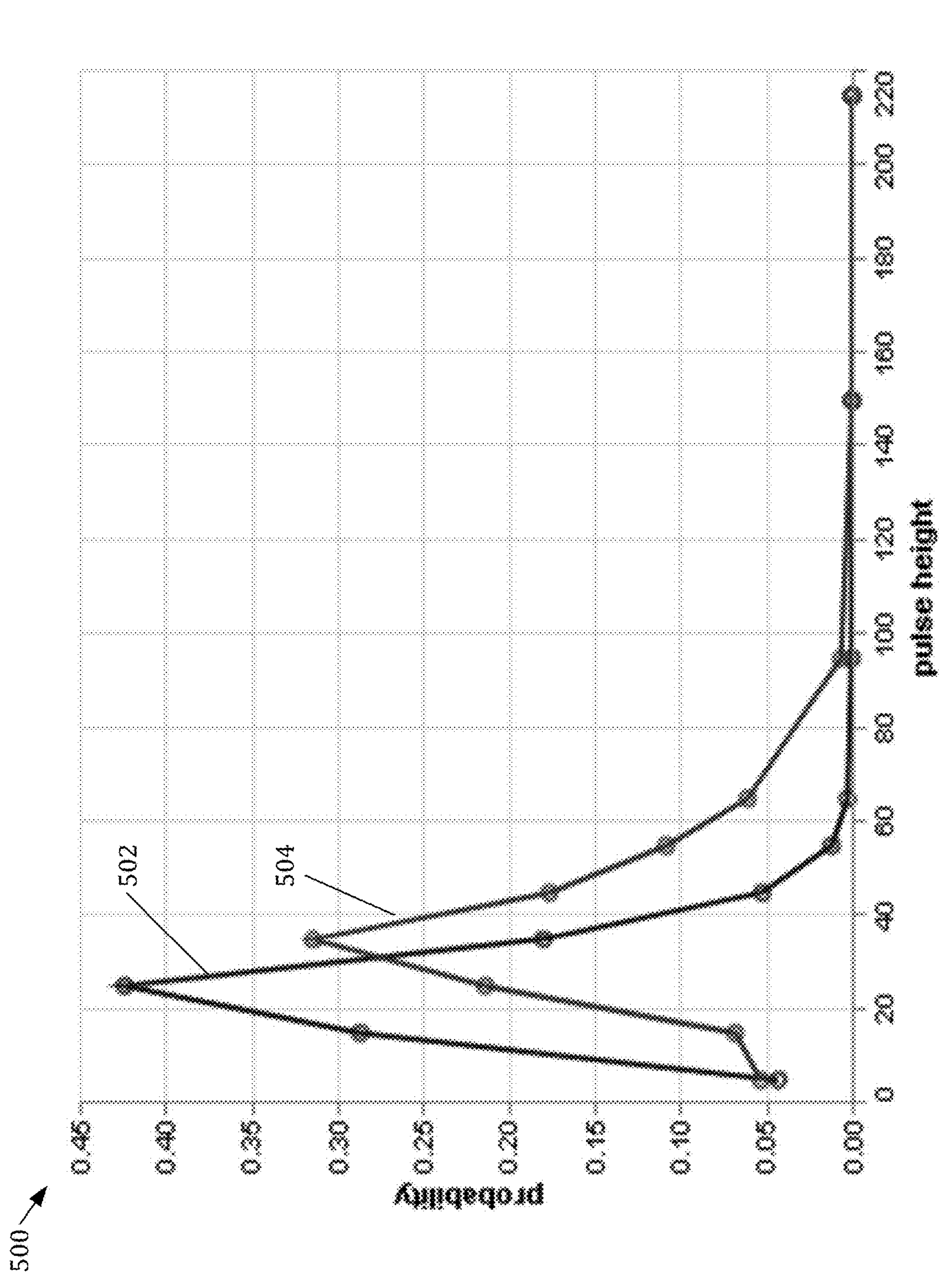
FIG. 5 depicts a plot of example pulse-height distributions.

Third, another challenge in such methods is that the detector response distributions for each particular type of ion are wide and often overlap for different species. FIG. 5 is a plot 500 illustrating an example of detector response distributions when detecting an ion with 3+ charge as compared to an ion with 7+ charge. As illustrated, a pulse-height distribution 502 for ions with 3+ charge is different from a pulse-height distribution 504 for ions with 7+ charge. As a result, the pulse-height distributions as observed by the detector for ions of a same m/z (an m/z value of 517 in this example) are wide and overlapping.

Such wide pulse-height distributions make any conventional charge state assignment approaches based on the detector responses intensities inferior due to the difficulty in discriminating between ions of a same m/z but different charge.

The problem of wide intensity distributions for direct identification of charge state using detection response intensity was recognized and a few strategies were proposed to deal with it for mass spectrometers employing image-charge based detectors. In such systems, the wide distribution predominantly can be attributed to the collisions with the residual neutral molecules during the measurement, which quench the coherent oscillation of the ion of interest and effectively stop the detection of its signal making its contribution dependent on the actual ion measurement time. Therefore, it was proposed to filter the detection events attributed to the ions experienced the collision during the acquisition (Kafader et. al. Anal. Chem. 2019, 91, 4, 2776-2783). This approach, however, leads to a large number of ions being discarded, thus sufficiently increasing the time to obtain good ion statistics. In addition, approaches to reduce base pressure and decrease ion velocity have also been proposed, however those adversely affect mass analyzer characteristics. Finally, it was proposed to employ sophisticated data processing techniques to detect exact time of the collision and hence scale the measured signal intensity according to the actual detection time (Kafader et. al. J. Am. Soc. Mass. Spectrom. 2019, 11, 2200-2203).

For mass spectrometers that use an electron-multiplier detector, the average number of secondary emission electrons is well defined for each ion with a particular m/z and charge, but the exact number of emitted primary electrons defining the magnitude of the observed response is a probabilistic quantity. Both secondary emission yield and collisions with the bath gas are described by Poisson statistics, but the underlying physics of the process is very different. Therefore, none of the techniques proposed to deal with the wide distributions for mass spectrometers employing image-charge induced detectors are applicable for the mass spectrometers with electron-multiplier based detection systems. Therefore, there is a need for technology to address at least this problem.

Often the detector response profile may be insufficient for accurate determination of the charge state, the detector response profile may be very helpful for separating signals originating from different compounds. This, in combination with the fact that the accurate charge state information is encoded in the m/z domain allows for substantially improved performance if conventional charge determination algorithms are coupled with the detector response domain for charge state determination.

Importantly, because separation happens at the last step of the mass spectrometry analysis, this method can be applicable in some cases where alternative approaches will not work. Specifically, liquid chromatography (LC) methods can provide separation of compounds; however, they are of little use for separation of the product ions originating from the same precursor, while the fragments from the same precursor can still substantially overlap. Similarly, ion mobility separation, which is conventionally performed before fragmentation (e.g. differential mobility separation) require significant modifications to setup post fragmentation separation.

One approach to enhance performance of the conventional charge determination algorithms is to leverage the detector response profiles for grouping the data. Often the same chemical compound has multiple isotopes forming an isotope cluster, which may or may not be resolved in the m/z domain. The m/z bins corresponding to the positions of those isotopes under certain circumstances may have similar detection response profiles. For example, the detector response profiles may be similar if at least two conditions are satisfied. First, the signal does not overlap (i.e. m/z bin does not contain signal from multiple different species); second, for all m/z bins, which contain the signal from those isotopes, the signal is acquired under predominantly single ion arrival conditions. This similarity allows for grouping of m/z bins containing information from the same compound-effectively splitting the signal between multiple channels. This yields substantially simplified spectra for subsequent charge detection analysis by conventional algorithms. Instead of charge detection, such simplified spectra can be used for direct spectral matching or other algorithms of compound or specie identification not performing charge detection step. For example, specie could be a microbial organism and corresponding data could be generated in MS and MS/MS (tandem MS) regimes. In some examples, libraries of simplified compound or specie spectra can be generated and used for said direct spectral matching.

Figure 1A:
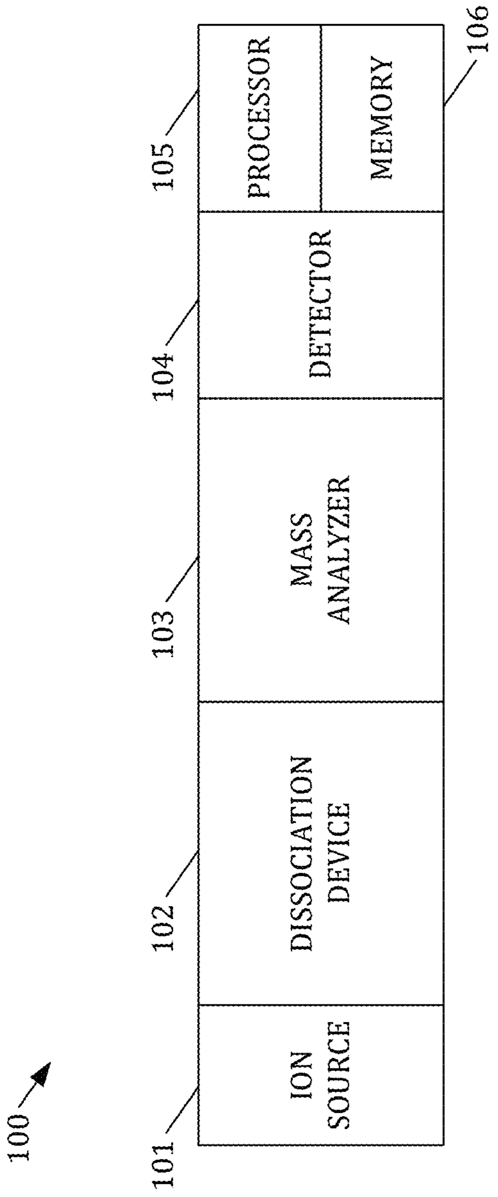
FIG. 1A depicts an example system for performing mass spectrometry.

FIG. 1A depicts an example mass analysis system 100 for performing mass spectrometry techniques. In some examples, the system 100 may be a mass spectrometer. The example system 100 includes an ion source device 101, a dissociation device 102, a mass analyzer 103, a detector 104, and computing elements, such as a processor 105 and a memory 106. The ion source device 101 may be an electrospray ion source (ESI) device, for example. The ion source device 101 is shown as part of a mass spectrometer or may be a separate device. The dissociation device 102 may be an Electron-based dissociation (ExD) device or collision-induced dissociation (CID) device, for example. Electron-based dissociation (ExD), ultraviolet photodissociation (UVPD), infrared photodissociation (IRMPD) and collision-induced dissociation (CID) are often used as fragmentation techniques for tandem mass spectrometry (MS/MS). ExD can include, but is not limited to, electron capture dissociation (ECD) or electron transfer dissociation (ETD). CID is the most conventional technique for dissociation in tandem mass spectrometers. As described above, in top-down and middle-down proteomics, an intact or digested protein is ionized and subjected to tandem mass spectrometry. ECD, for example, is a dissociation technique that dissociates peptide and protein backbones preferentially. As a result, this technique is an ideal tool to analyze peptide or protein sequences using a top-down and middle-down proteomics approach.

The mass analyzer 103 can be any type of mass analyzer used for a desired technique, such as a time-of-flight (TOF), an ion trap, or a quadrupole mass analyzer. The detector 104 may be an appropriate detector for detection ions and generating the signals discussed herein. For example, the detector 104 may include an electron multiplier detector that may include analog-to-digital conversion (ADC) circuitry. The detector 104 may produce detection pulses for detected ions. The detector 104 may also be an image charge induced detector.

The computing elements of the system 100, such as the processor 105 and memory 106, may be included in the mass spectrometer itself, located adjacent to the mass spectrometer, or be located remotely from the mass spectrometer. In general, the computing elements of the system may be in electronic communication with the detector 104 such that the computing elements are able to receive the signals generated from the detector 104. The processor 105 may include multiple processors and may include any type of suitable processing components for processing the signals and generating the results discussed herein. Depending on the exact configuration, memory 106 (storing, among other things, mass analysis programs and instructions to perform the operations disclosed herein) can be volatile (such as RAM), non-volatile (such as ROM, flash memory, etc.), or some combination of the two. Other computing elements may also be included in the system 100. For instance, the system 100 may include storage devices (removable and/or non-removable) including, but not limited to, solid-state devices, magnetic or optical disks, or tape. The system 100 may also have input device(s) such as touch screens, keyboard, mouse, pen, voice input, etc., and/or output device(s) such as a display, speakers, printer, etc. One or more communication connections, such as local-area network (LAN), wide-area network (WAN), point-to-point, Bluetooth, RF, etc., may also be incorporated into the system 100.

Figure 1B:
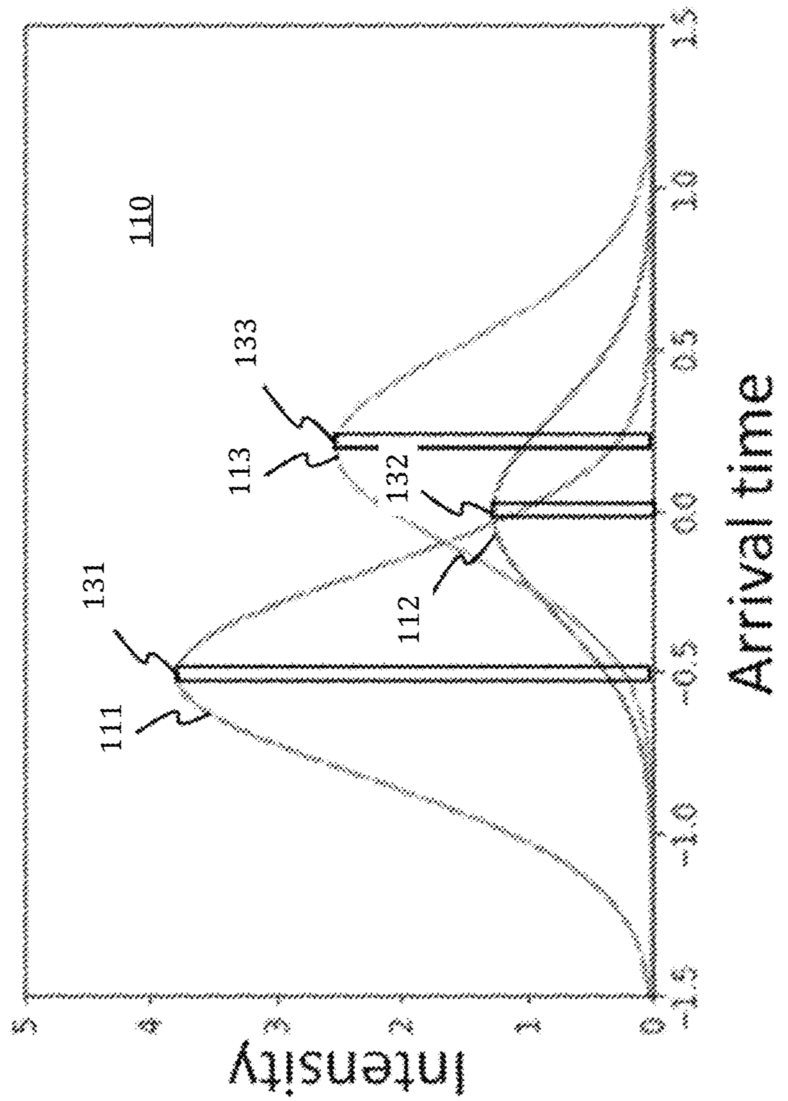
FIG. 1B depicts an example plot of ion pulses.

FIG. 1B depicts an example plot 110 of ion pulses generated from a detector, such as an electron-multiplier detector. The y-axis represents an intensity, and the x-axis represents time. The intensity may be in units of voltage. For instance, for an electron multiplier detector, the output of the detector may be a voltage (often represented in millivolts (mV)) based on the detected electrons.

In FIG. 1B, three pulses are depicted—a first pulse 111, a second pulse 112, and a third pulse 113. Each of the pulses 111-113 represent different single ion arrivals at the detector. The pulses 111-113 may be digitized, and a peak may be found from each digitized pulse. An intensity (or peak height) and arrival time pair may be calculated and stored for each of the pulses. Rectangles 131, 132, and 133 represent the intensity, or pulse height, of the respective pulse.

Each of the pulses may be characterized by pulse characteristics. The pulse characteristics may include characteristics such as pulse height, pulse width, and/or area under the curve of the pulse. The pulse height of each pulse is indicated by the rectangles 131, 132, and 132. The pulse height may be the maximum pulse height for the respective pulse, and the pulse height may have units of voltage. The pulse width may be at any point of the pulse, but one measure of pulse width may be the full width at half maximum (FWHM). The pulse width may have units of time. The area under the pulse curve may be generated by integrating the area under the respective pulse signal for each pulse.

Figure 1C:
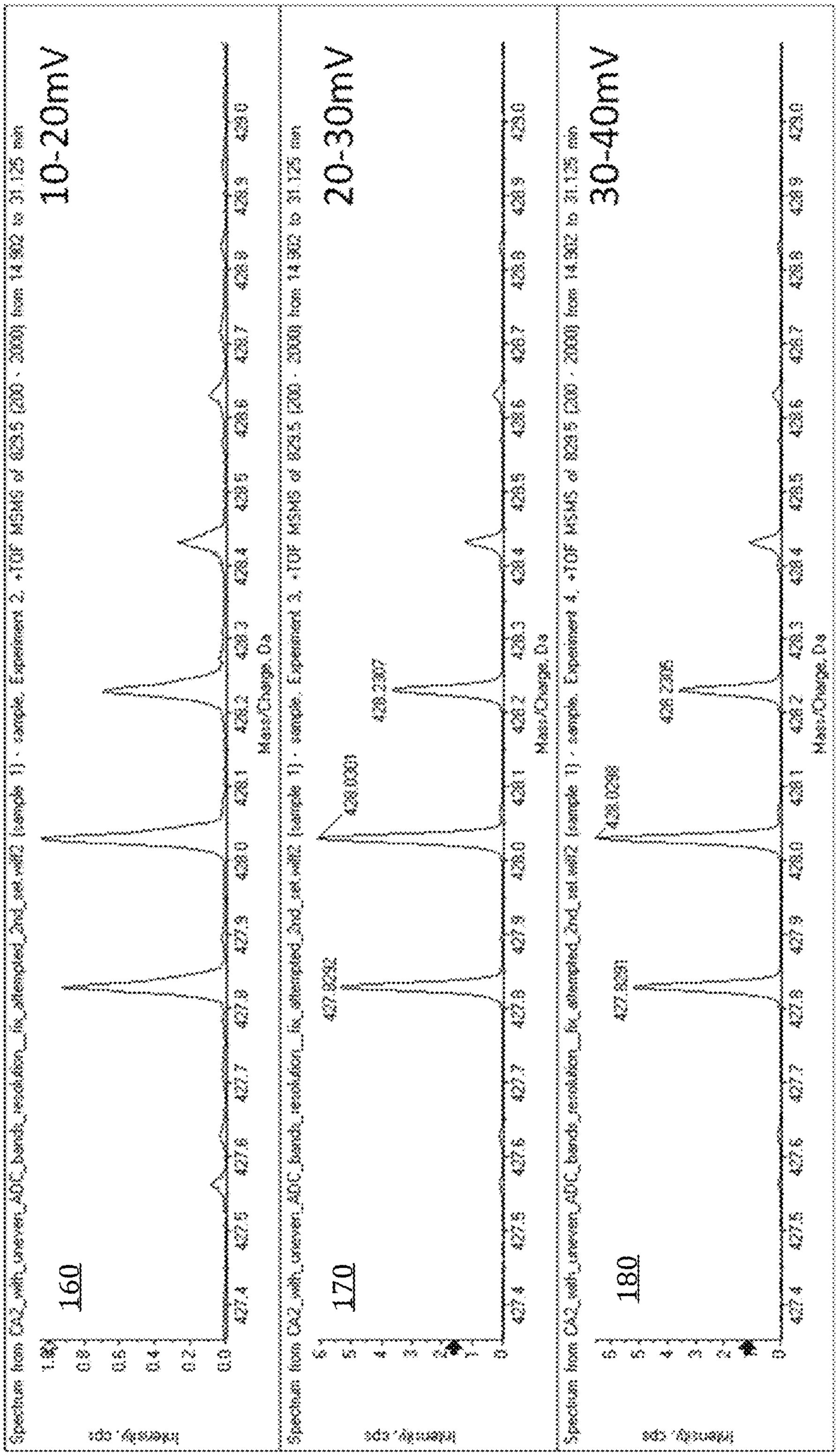
FIG. 1C depicts example mass spectra separated into different bands or channels based on ion pulse intensities.

The pulse characteristics may be used to separate the detected ions into different bands. FIG. 1C depicts example mass spectra 150 separated into different bands or channels based on ion pulse characteristics-specifically maximum pulse height. A first mass spectrum 160 is generated for detected ions having a maximum pulse height between 10-20 mV. A second mass spectrum 170 is generated for detected ions having a maximum pulse height between 20-30 mV. A third mass spectrum 180 is generated for detected ions having a maximum pulse height between 20-30 mV. Additional details regarding such separation and banding are discussed further in the '720 Publication. As discussed above, while separating ions into different bands has benefits, the separation does not allow for the identification of a charge state of a particular ion. As discussed further herein, the pulse characteristics may be utilized to generate detector response profiles that allow for grouping of m/z bins and ultimately charge classifications.

Figure 2:
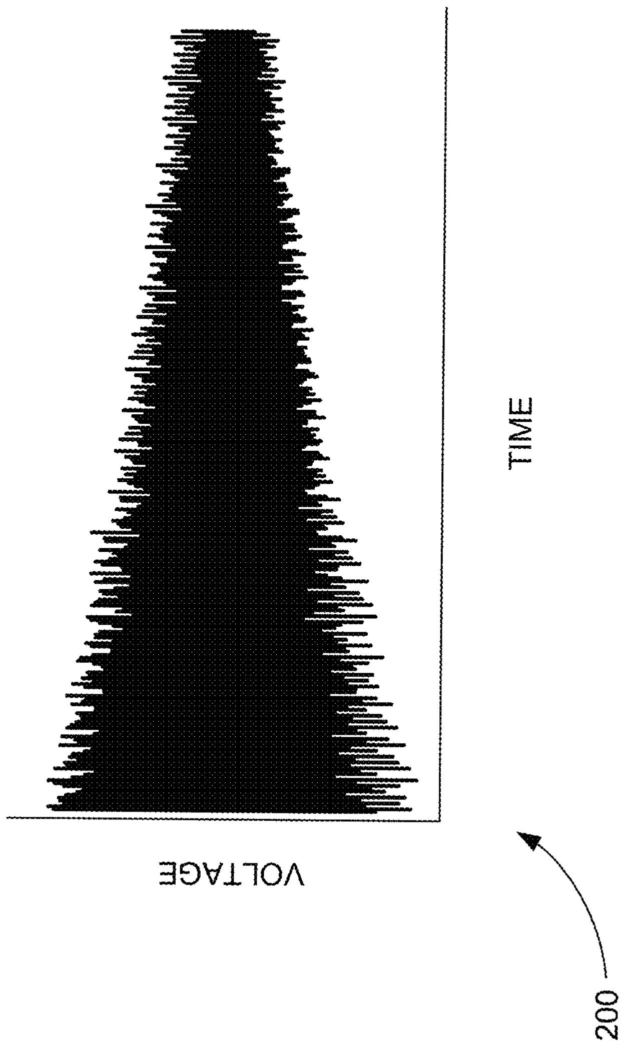
FIG. 2 depicts an example plot of a transient time-domain signal measured by an image-charge detector

FIG. 2 depicts an example plot 200 of a transient time-domain signal measured by an image-charge detector that includes components from each of a plurality of ions oscillating in a mass analyzer. In order to decompose the transient time-domain signal measured by an image-charge detector into individual components, the transient time-domain signal is converted to a frequency-domain signal. Conversion methods include, but are not limited to, Fourier transformation or wavelet transformation. Peaks in the frequency-domain signal correspond to individual ions of the plurality of ions oscillating in a mass analyzer. Frequency-domain peaks are converted to m/z peaks using well-known formulas that are dependent on the specific type of mass analyzer in order to produce a mass spectrum.

For image-charge detectors, therefore, the intensity of frequency-domain signals or peaks are proportional to the charge state of the underlying ions similar as to how the pulses described above are proportional to charge state. Thus, the intensity or other characteristics of the frequency-domain (FD) peaks may be used to generate distributions similar to the pulse-characteristic distributions discussed above. Distributions generated from the characteristics of the FD peaks may be referred to as FD-peak-characteristic distributions or FD-peak-intensity distributions where intensity of the FD peak is used as the characteristic of interest. The FD-peak-characteristic distributions may then be used in substantially the same manner as the pulse-characteristic distributions to determine charge state.

Figure 3:
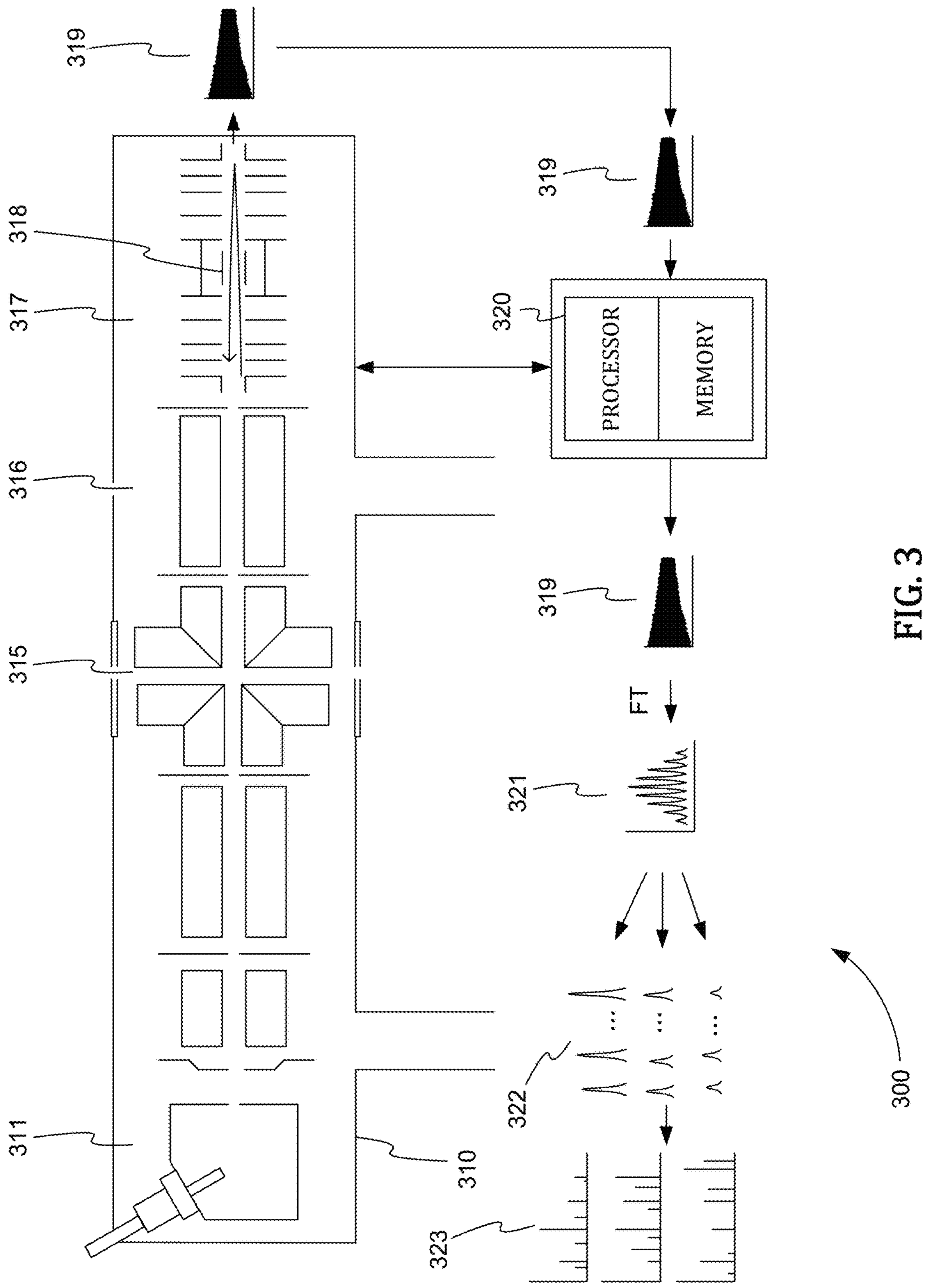
FIG. 3 depicts an example system including an image-charge detector.

FIG. 3 depicts an example system 300 including an image-charge detector 318. The system of FIG. 3 includes mass spectrometer 310 and computing components including memory and a processor 320. The computing elements of the system, such as the processor 320 and memory, may be included in the mass spectrometer itself, located adjacent to the mass spectrometer, or be located remotely from the mass spectrometer. In general, the computing elements of the system may be in electronic communication with the detector 318 such that the computing elements are able to receive the signals generated from the detector 318. The processor 320 may include multiple processors and may include any type of suitable processing components for processing the signals and generating the results discussed herein.

Mass spectrometer 310 includes mass analyzer 317. Mass analyzer 317 includes image-charge detector 318. Image-charge detector 318 produces oscillating signals or transient time-domain signals for detected ions with amplitudes that are proportional to the ion charge state. Mass analyzer 317 can be any type of mass analyzer that can detect ions using an image-charge detector including, but not limited to, an electrostatic linear ion trap (ELIT), an FT-ICR, or an orbitrap mass analyzer. Mass analyzer 317 is shown in FIG. 13 as an ELIT, and image-charge detector 318 is shown as a pickup electrode of the ELIT.

The mass analyzer 317 detects transient time-domain signal 319 induced on image-charge detector 318 by oscillations of a plurality of ions in mass analyzer 317. The plurality of ions is transmitted to mass analyzer 317 by mass spectrometer 310. Processor 320 converts transient time-domain signal 319 to a plurality of frequency-domain pulses or peaks 321. Each frequency-domain signal corresponds to an ion of the plurality of ions. Processor 320 converts transient time-domain signal 319 to a plurality of frequency-domain peaks 321 using a Fourier transform, for example.

Processor 320 may compare an intensity of each frequency-domain peak of plurality of frequency-domain peaks 321 to two or more different predetermined intensity ranges corresponding to two or more different charge state ranges. Processor 320 may store each frequency-domain peak in one of two or more data sets 322 corresponding to the two or more predetermined intensity ranges based on the comparison. Mass spectra 1623 may then be generated from the from the data sets 322. Processor 320 may create a mass spectrum based on frequency-domain peaks and/or the identified charge states discussed herein.

In various embodiments, processor 320 converts transient time-domain signal 319 to plurality of frequency-domain peaks 321, compares an intensity of each frequency-domain peak to two or more different predetermined intensity ranges, and stores each frequency-domain peak in one of two or more data sets 322 during acquisition. In an alternative embodiment, processor 320 converts transient time-domain signal 319 to plurality of frequency-domain peaks 321, compares an intensity of each frequency-domain peak to two or more different predetermined intensity ranges, and stores each frequency-domain peak in one of two or more data sets 322 after acquisition.

As described above, if multiple copies of the same ion are oscillating in mass analyzer 317 at the same time, the measured intensity may not be proportional to the charge state. As a result, in various embodiments, mass spectrometer 310 transmits ions to mass analyzer 317 so that mass analyzer 317 only includes a single ion of a specific m/z and charge state at any given time.

In various embodiments, the system of FIG. 3 further includes ion source device 311. Ion source device 311 can be an electrospray ion source (ESI) device, for example. Ion source device 311 is shown as part of mass spectrometer 310 in FIG. 3 but can be a separate device also. In addition, mass spectrometer 310 further includes a dissociation device. The dissociation device can be, but is not limited to, ExD device 315 or CID device 316. A dissociation device can be used for top-down protein analysis, for example.

In top-down protein analysis, ion source device 311 ionizes a protein of a sample, producing a plurality of precursor ions for the protein in an ion beam. The dissociation device dissociates the plurality of precursor ions in the ion beam, producing a plurality of product ions with different charge states in the ion beam. The mass spectrometer 310 transmits the plurality of product ions to mass analyzer 317 so that the plurality of product ions are the plurality of ions transmitted to mass analyzer 317 by mass spectrometer 310, as described above.

In various embodiments, processor 320 is used to control or provide instructions to ion source device 311 and mass spectrometer 310 and to analyze data collected. Processor 320 controls or provides instructions by, for example, controlling one or more voltage, current, or pressure sources (not shown).

FIG. 4 depicts an example plot illustrating an example of multiple overlapping features in an ECD top-down spectrum of carbonic anhydrase 2 (CA2). FIG. 5 depicts a plot 500 of example pulse-characteristic distributions. The pulse-characteristic distributions were based off of the analysis performed to generate the spectra in FIG. 4. The pulse characteristic distributions in the plot 500 are based on the characteristic of pulse height. Accordingly, the pulse-characteristic distributions may be referred to as pulse-height distributions or intensity distributions. In the plot, the x-axis represents the pulse height, and the y-axis indicates a probability or frequency of detection. For example, a higher probability value indicates that ions having the corresponding pulse height were detected more frequently.

A first pulse-characteristic distribution 502 and a second pulse-characteristic distribution 504 are depicted in the plot 500. As can be seen from the plot 500, the pulse-characteristic distributions overlap, but the first pulse-characteristic distribution 502 has a profile that is distinct from the profile of the second pulse-characteristic distribution 504. The difference in profile shape is predominately due to a different in charge state of the detected ions forming the respective pulse-height distributions. For instance, the detected ions forming the first pulse-characteristic distribution 502 correspond to a 3+ charge ion, and the detected ions forming the second pulse-characteristic distribution 504 correspond to a 7+ charged ion. Accordingly, once various pulse-height distributions have been established or generated, it may be possible to determine a charge state of any single detected ion by determining on which pulse-height distribution profile the corresponding ion pulse fits. The pulse-characteristic distributions may be considered to be detector response profiles.

As some additional detail, the pulse-characteristic distributions 502, 504 were generated for product ions having very similar m/z values at approximately 517. The product ions were generated from a top-down ECD analysis of carbonic anhydrase 2 (CA2), such as the spectra depicted in FIG. 4. As discussed above, as can be seen in plot 500, the pulse-height distributions originating from different charge states can significantly overlap. In case of such overlap, a single intensity data point is insufficient, and any charge state determination based on a single intensity data point will have a significant chance being incorrect.

As discussed above, one approach to enhance performance of the conventional charge determination algorithms is to leverage the pulse-characteristic distributions for grouping the data. Often the same chemical compound has multiple isotopes forming an isotope cluster, which may or may not be resolved in the m/z domain. The m/z bins corresponding to the positions of those isotopes under certain circumstances have similar detection response profiles. This similarity allows for grouping of m/z bins containing information from the same compound-effectively splitting the signal between multiple channels. This yields substantially simplified spectra for subsequent charge detection analysis by conventional algorithms.

Figure 6:
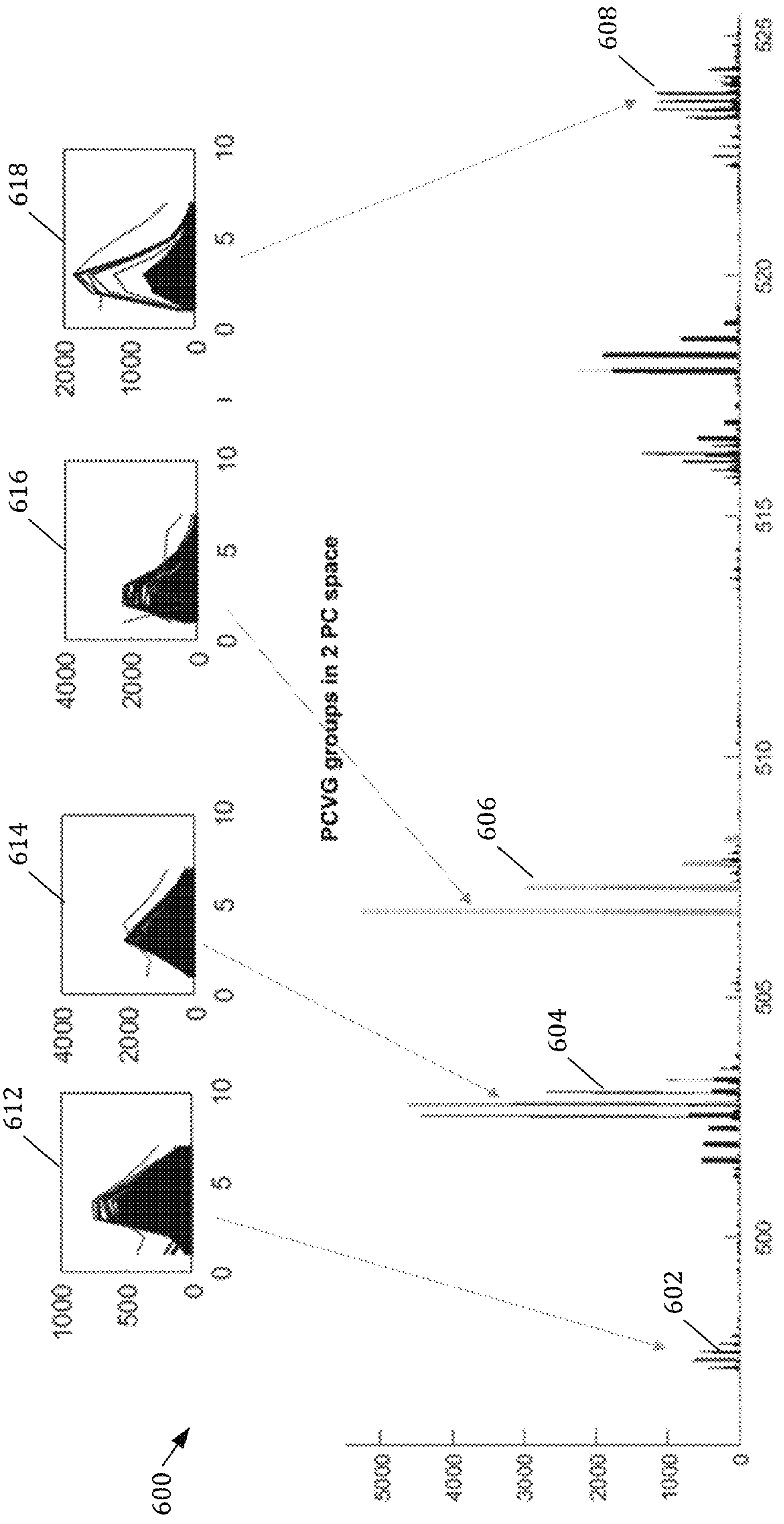
FIG. 6 is a plot illustrating an example of a mass spectrum split into m/z bins.

FIG. 6 is a plot 600 illustrating an example of a mass spectrum split into m/z "bins". Each m/z "bin" represents an m/z range and contains a portion of the mass spectrum (e.g., ion counts for ions within the m/z range). Various m/z bins are then grouped based on the similarity of their detector response profiles, such as the pulse-characteristic distributions discussed above. By grouping the m/z bins in such a manner, substantially simplified spectra may be formed for each group. These grouped spectra may be shown in in the spectra as different colors (e.g., 'red', 'black', 'dark blue', 'light blue') or distinguished in other manners or formats. In other examples, separate spectrums for each of the grouped bins may be generated, displayed, and/or analyzed.

In the example plot 600 depicted, four separate groupings are highlighted, including a first grouping of m/z bins 602, a second grouping of m/z bins 604, a third grouping of m/z bins 606, and a fourth grouping of m/z bins 606. The corresponding detector response profiles for each grouping are also shown with an arrow connecting the detector response profiles to the associated grouping of m/z bins. For instance, a first set of detector response profiles 612 are shown as corresponding to the first grouping 602. This first grouping of m/z bins 602 share a similar detector response profile (ash shown in first set of detector response profiles 612), and were thus grouped together. Similarly, other sets of detector response profiles 614-618 are also depicted as corresponding to the respective grouping of m/z bins.

In cases where the mass spectrometry system includes additional separation domains (e.g. retention time for LC separation, drift time, compensation voltage for ion mobility domain, etc.), one or more of the separation domains may also be used, alone or in combination, to group the signal. In some aspects, a combination of separation domains may be utilized to group the signal into a plurality of specific subgroups. For instance, the m/z bin groupings may be first based on detector response profiles, and then be further sub-grouped based on such additional separation domain data. In other examples, the m/z bin groupings may be first based on the additional separation domain data, and then sub-grouped based on the detector response profiles. In other examples, the m/z groupings may be based on both a similarity of detector response profiles and the additional separation domain data.

The grouping of the m/z bins may be performed by a variety of variety of multivariate analysis algorithms such as, for example, principal component analysis (PCA), k-means clustering, t-distributed stochastic neighbor embedding (t-SNE) or other known grouping algorithms known in the art. In the example depicted, a principal component variable grouping (PCVG) algorithm was used to group the m/z bins.

Figure 7:
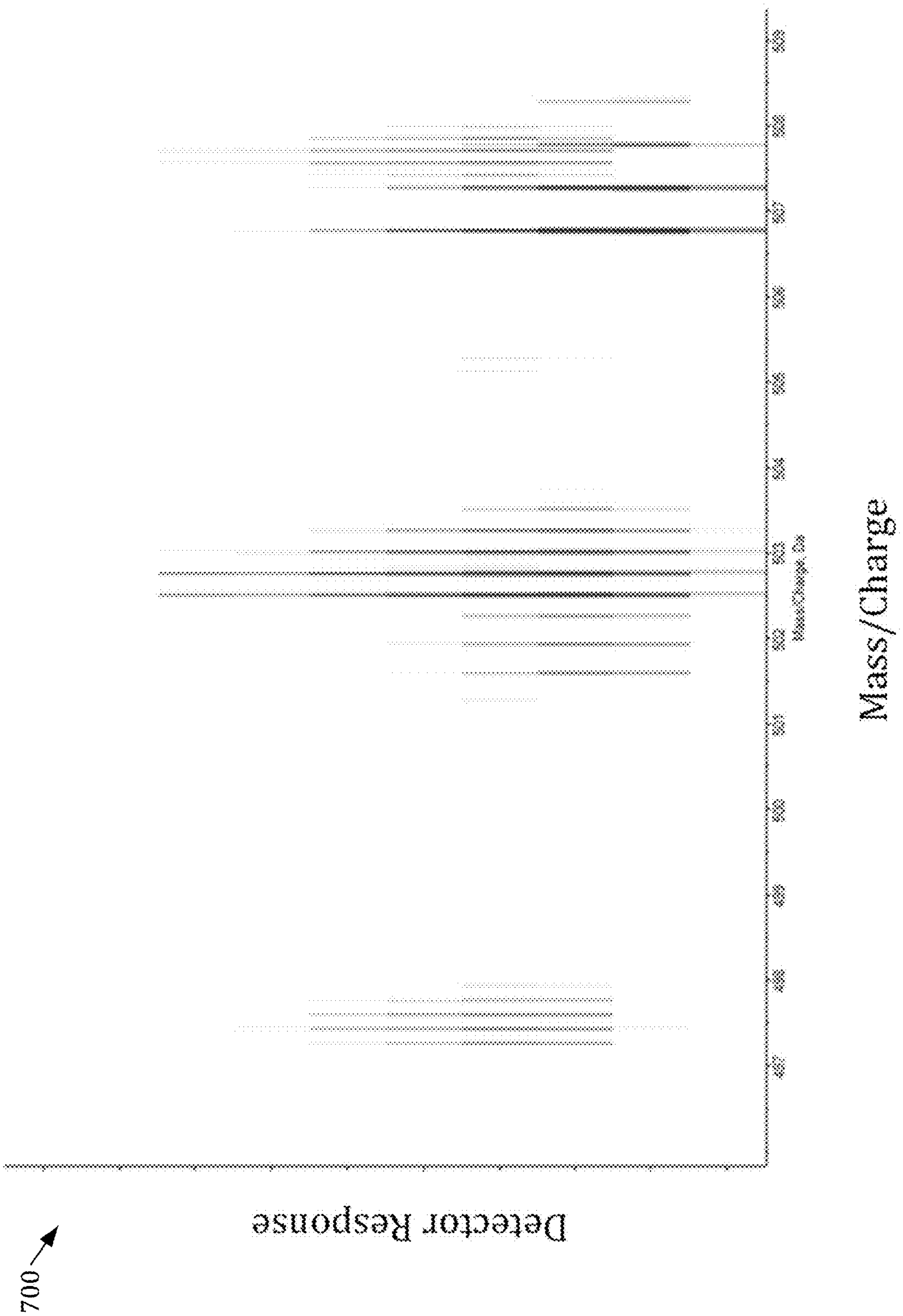
FIG. 7 depicts an example heatmap.

The use of the detector response profiles to group or correlate different m/z bins with one another may also be done in different manners and through different representations. For example, FIG. 7 depicts an example heatmap representing m/z on the x-axis, detector response on the y-axis, and an ion count or probability of the corresponding detector response as the intensity of the color in the heatmap. For instance, the more intense the color, the more ions that were counted at the corresponding m/z position and detector response position. The detector response axis may have units corresponding to the type of detector response profiles utilized. For instance, the detector response axis may represent pulse height.

Visualizations or representations that are capable of representing three quantities (e.g., such as three-dimensional plots with probability or ion count as the depth axis) may also be utilized. For instance, the representation has a first dimension of detector response, a second dimension of m/z position, and a third dimension of probability or ion count. By generating such visualizations or representations, the detector response profile data and m/z position information may be processed in single algorithm. For example, these data representations may be subjected to various pattern recognition algorithms, which may allow for the patterns to be classified and/or detected. These pattern recognition algorithms can for example be machine-learning algorithms or image-recognition algorithms.

In some embodiments additional steps can be performed which may include, for instance, generating a library of detector response profiles and their associated charge states using well-characterized compounds. The library may be a generic library, applicable to a number of instruments or, alternatively, the library may be a custom library generated for a particular instrument. The library of detector response profiles and associated charge states for each of the well-characterized compounds providing reference templates or detector response distributions that may be stored and then later accessed for comparison in subsequent analysis. For instance, in a subsequent analysis, a captured detector response profile may be compared to the stored detector response profiles in the library of detector response profiles to identify a corresponding stored detector response profile in order to identify an associated charge state for the captured detector response profile.

Optionally an m/z position of a compound may be stored in the library of detector response profiles and associated charge states in association with a compound of interest. In this embodiment, a step of charge state assignment is performed based on a degree of similarity between a captured detector response profile generated from captured mass analysis data captured for the compound of interest and a stored detector response profile in the library associated with that compound. The m/z position defining one or more m/z bins attributed to a corresponding one or more adjacent charge states for the compound. In a subsequent step, the defined one or more m/z bins may then be co-extracted from the captured mass analysis data for subsequent analysis. Such library of detector responses can be interchangeably called catalogue of detector responses.

In some cases, overlapping features have not only interdigitated peaks, but also overlapping peaks, where a single m/z bin contains a signal that originated from multiple different species reaching the detector. In some cases, such a signal can be accurately attributed to those overlapping features. Indeed, if there are no co-detected events the total signal is a sum of the respective contributions originating from the different species and therefore can be decomposed into individual contributions using conventional linear algebra algorithms such as, for instance, non-negative least squares (NNLS) algorithm among other decomposition techniques. It is convenient to call a detector response profile originating from a single specie and recorded under a single ion arrival condition an elementary detector response profile. In some aspects, a plurality of detector response profiles may be captured. Each of the plurality of detector response profiles corresponding to its own elementary detector response profile, or an associated combination of elementary detector response profiles. In either case, each detection response profile corresponding to an overlapping peak can be decomposed into its elementary detector response profile (s).

In cases where the condition of single ion arrivals would not be satisfied for every ion, there are arrival events where the m/z bins containing signal from the same type ions will have different detector response distributions depending upon a number of ions that arrived at that event. Indeed, the signal is effectively summed on the detector and having multiple ions arriving simultaneously will lead to a rightward shift of the intensity of the detector response distributions.

Figure 8:
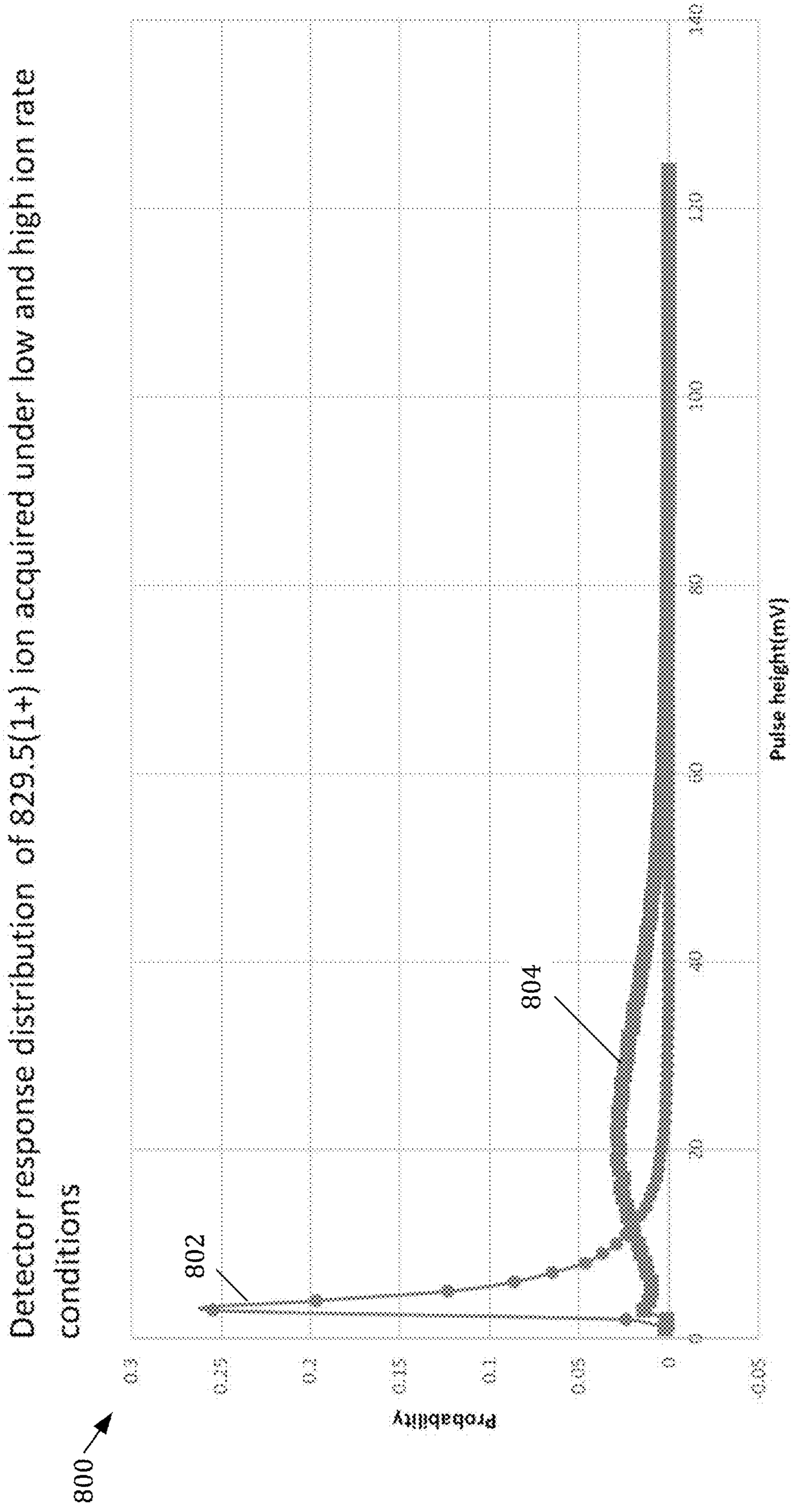
FIG. 8 is a plot indicating example detector response profiles.

FIG. 8 is a plot indicating example detector response profiles (e.g., distributions) in response to a same ion type arriving at different rates relative to the acquisition cycle. In the example of FIG. 8 the ion delivery rates correspond to an average number=0.2 ions per TOF push (predominantly single ion arrival for each acquisition cycle) and an average number=6 ions per push (predominantly multi-ion arrival for each acquisition cycle). The first detector response profile (e.g., distribution) 802 corresponds to the lower ion delivery rate with predominantly single ion arrival, and the second detector response profile (e.g., distribution) 804 corresponds to the higher ion deliver rate with predominantly multi-ion arrival.

As indicated, multi-ion arrival can prevent efficient grouping of such ions. In certain cases, it is hard to satisfy the condition of single ion arrival for every acquired type of ion. This is specifically a problem if there is a large discrepancy in total counts of different ion species. In this case, very long acquisition times will be required to acquire the data with enough statistics for low abundance ions, while satisfying the condition of a single ion arrival for high abundant ions. Therefore, it is desirable to have a strategy, which can tolerate certain number of multiplicity for the ion arrivals.

Importantly, single ion arrivals and multiple ion arrivals can be distinguished by a simple examination of the frequency of observed detection events in the m/z bin. The process can be modeled using Poisson distribution and with simple calculation of 'no detection' occurrences for specific m/z bin, it is possible to calculate the frequencies of each ion multiplicity in the same bin. Such frequencies then can be used as an input to the grouping algorithms to help assign ions with different multiplicities to the same group of ions. Cases of overlapping features at higher multiplicity may be resolved using a Bayesian framework, or other suitable technique. Based on the building blocks a number of different embodiments are possible, which combine an m/z and detector response domains and address charge state determination problem.

Figure 9:
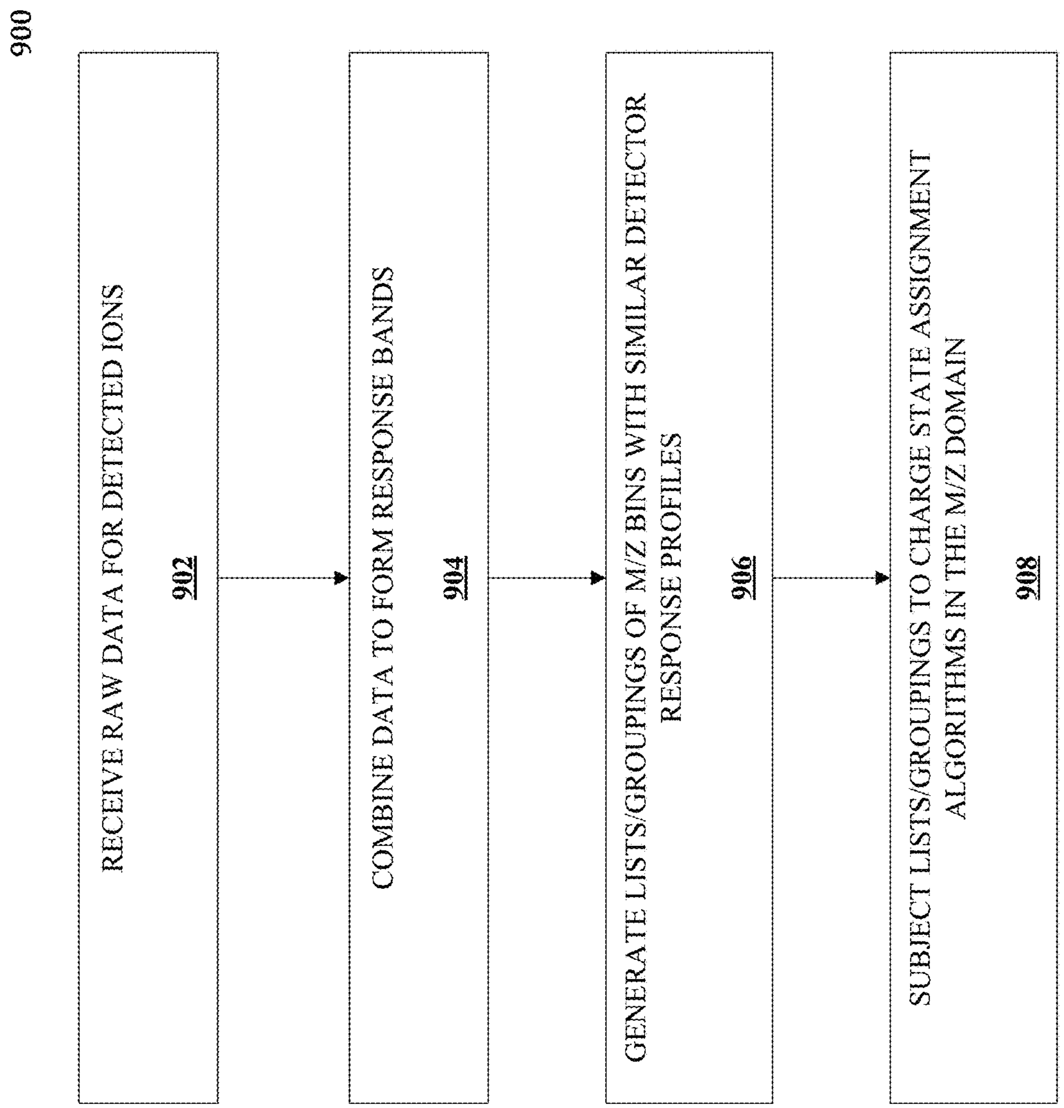
FIG. 9 depicts an example method for charge state assignment using detector response profiles.

FIG. 9 is an example method 900 for charge state assignment using detector response profiles. At operation 902 of the example method 900 of FIG. 9, data is acquired in raw mode (retaining information about each detection event). For instance, pulse characteristics or frequency domain information from the detector is retained such that detector response profiles may be generated. As an example, the raw data may be received as a detector response signal corresponding to a plurality of ion arrival events. That detector response signal includes information related to individual ion responses (e.g., pulses) generated by a detector for each ion arrival event. At operation 904, the data may be combined to form detector response bands and spectra, such as the banded spectra shown and discussed above with respect to FIG. 1C and as described in '720 Publication. Operations 902 and 904 may be combined and performed during data acquisition. In some examples, operation 904 may be omitted and a non-banded spectra may be used.

Following operations 902 and 904, each m/z bin (with a non-zero ion count) is grouped according to their detector response profiles at operation 906. Grouping of the m/z bins may include generating lists of m/z bins that have similar detector response profiles. This step can be performed using for example grouping algorithms, such as PCA or K-nearest neighbor algorithms, that receive the detector response profiles for the m/z bins as input. Grouping of m/z bins may also be based on applying pattern recognition algorithms to representations such as the heatmap of FIG. 7 or other types of representations discussed in relation to FIG. 7. Such pattern recognition algorithms may include, for example, machine-learning algorithms or image-recognition algorithms. As discussed above, the grouping operation may also be based on additional separation domain data (e.g. retention time for LC separation, drift time, compensation voltage for ion mobility domain, etc.) associated with detection events/ions in the m/z bin.

Operation 906 may also include generating the detector response profiles for each of the m/z bins. Generating the detector response profiles may be generated during acquisition based on the pulse characteristic (or frequency domain characteristic) that is received for each detection event. Thus, in some examples, each pulse characteristic need not be stored as corresponding to each detected ion. Rather, the detector response (e.g., pulse characteristic) is stored as associated with an m/z bin to allow for the creation of the detector response profile for the m/z bin.

Based on the lists and/or groupings of m/z bins generated in operation 906, a substantially simplified mass spectrum may be formed. Multiple simplified mass spectra may be generated based on the groupings. For example, a different spectrum for each grouping or list of m/z bins may be generated. The simplified spectrum and/or spectra may then be subjected to charge state assignment algorithms that may be applied in the m/z domain at operation 908. This operation may be performed using charge deconvolution algorithms in m/z space as will be appreciated by those having skill in the art. Application of the charge state assignment algorithms results in an assignment of a charge state of a feature formed by m/z bins of a particular group. For example, each grouping of m/z bins may be assigned a charge state. Optionally, the signal representing this feature (e.g., the signal formed by a corresponding grouping of m/z bins) can be converted to zero-charge signal (e.g., multiplying the assigned charge by the m/z value) and co-added to form a mass spectrum as part of operation 908. With the charge state identified, a particular analyte and/or amount of a particular analyte may be more accurately determined from the resultant mass spectra.

Figure 10:
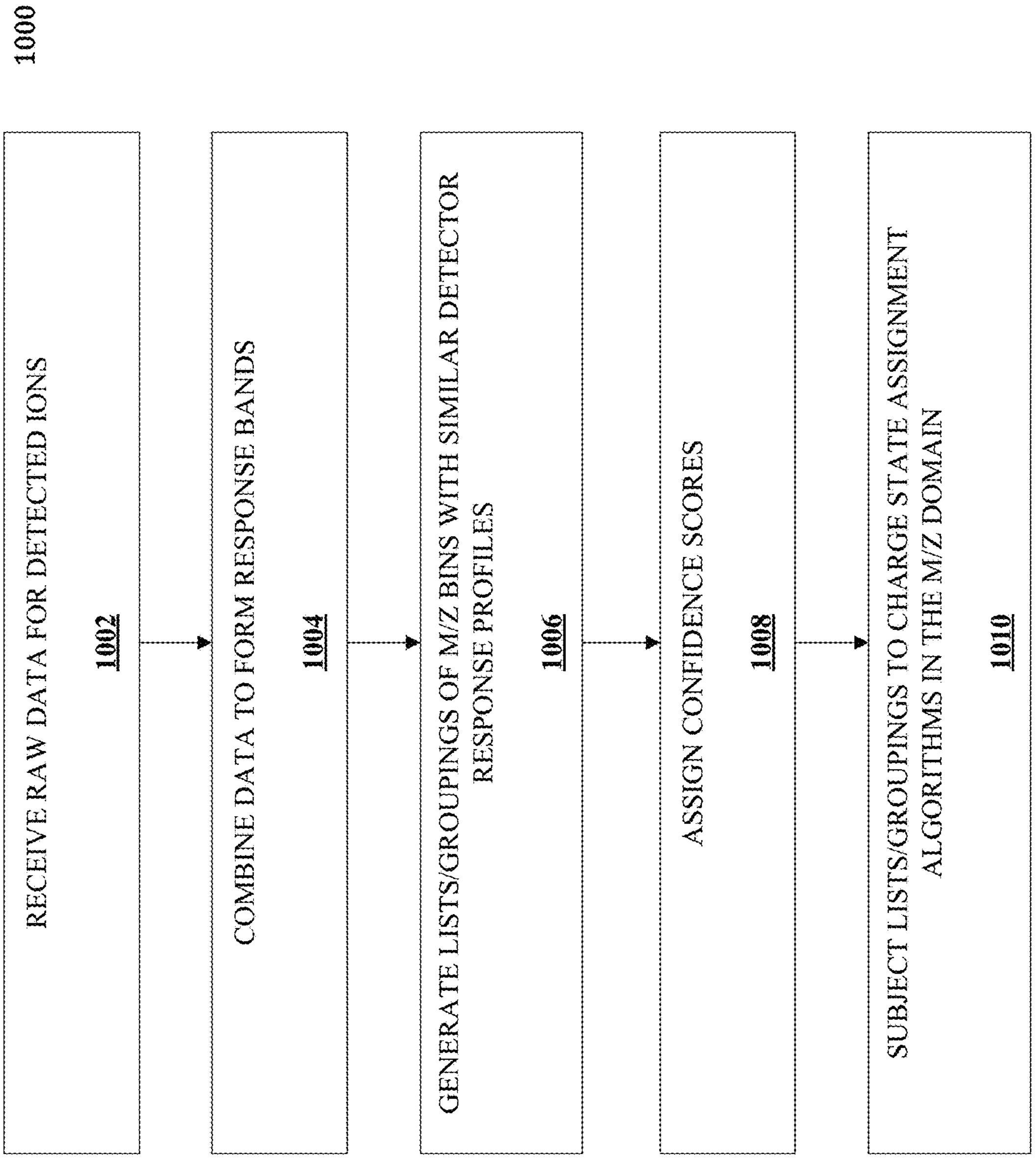
FIG. 10 depicts an example method for charge state assignment using detector response profiles.

FIG. 10 is another example method 1000 for charge state assignment using detector response profiles. In the example method 1000 of FIG. 10, operations 1002-1006 are similar to operations 902-906 of method 900 depicted in FIG. 9 and described above. Operation 1008 in method 1000 adds the operation of a determining or assigning a confidence score to the groupings or lists generated in operation 1006. The confidence score may be a scoring of the grouping quality, which represents the quantitative degree of similarity of the m/z bin towards a certain group or groups. For instance, the detector response profile of one m/z bin may partially match several other detector response profiles of other m/z bins. The grouping, however, is ultimately based on the best match of the partial maps. The strength of that match may be represented by the confidence score. The groupings/lists generated in operation 1006 and the confidence scoring output generated in operation 1008 may then be used as an input for charge state determination algorithms in m/z space/domain in operation 1010, similar to operation 908 in method 900 of FIG. 9. In some examples, the charge state determination algorithms may be based on a Bayesian framework, such as the UniDec algorithm (Marty et. al Anal. Chem. 2015, 87, 8, 4370-4376) for example, which can benefit from the additional confidence scores generated in operation 1008.

Figure 11:
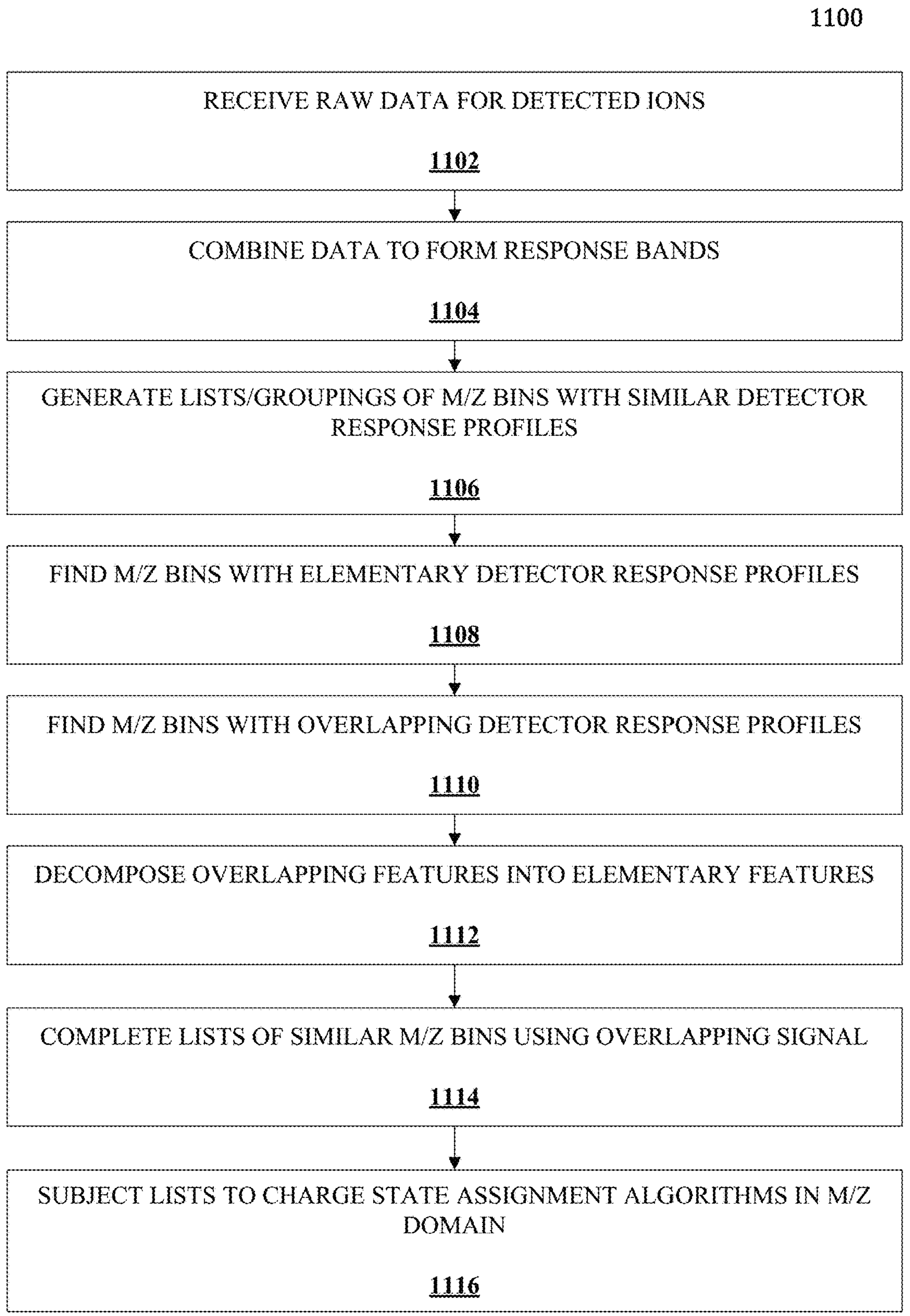
FIG. 11 depicts an example method for charge state assignment using detector response profiles.

FIG. 11 is another example method 1100 for charge state assignment using detector response profiles. In the example method 1100 of FIG. 11, the operations 1102-1106 are similar to operations 902-906 of method 900 depicted in FIG. 9 and described above. At operation 1108, m/z bins with signal attributed to elementary detector response profiles are identified. One example method for this is to inspect m/z bins contained in each group for resembling a complete or partial isotope cluster with at least two isotopes being attributed. The corresponding detector responses from those m/z bins within said group may be attributed to the elementary detector responses.

At operation 1110, m/z bins with overlapping detector response profiles are found or identified. This operation may be completed by identifying all the non-zero m/z bins not identified in operation 1108. These identified m/z bins with overlapping detector response profiles may be attributed to an overlapping signal. At operation 1112, the overlapping signals for each m/z bin identified in operation 1110 is decomposed to elementary signals using known algorithms such as a non-negative least squares (NNLS) algorithm. At operation 1114, the groupings/lists of m/z bins are completed using the decomposed signals generated in operation 1112. For instance, the portions of the decomposed elementary signals are then be grouped/listed such that corresponding signal (e.g., ion counts) amount from each contributing detector response profile is added to the correct grouping. At operation 1116, the groupings/lists of m/z bins are subjected to charge state assignment algorithms in the m/z domain, similar to the operations discussed above. For example, the identification may, for example, be based on a relative distance of peaks forming an isotope cluster.

Figure 12:
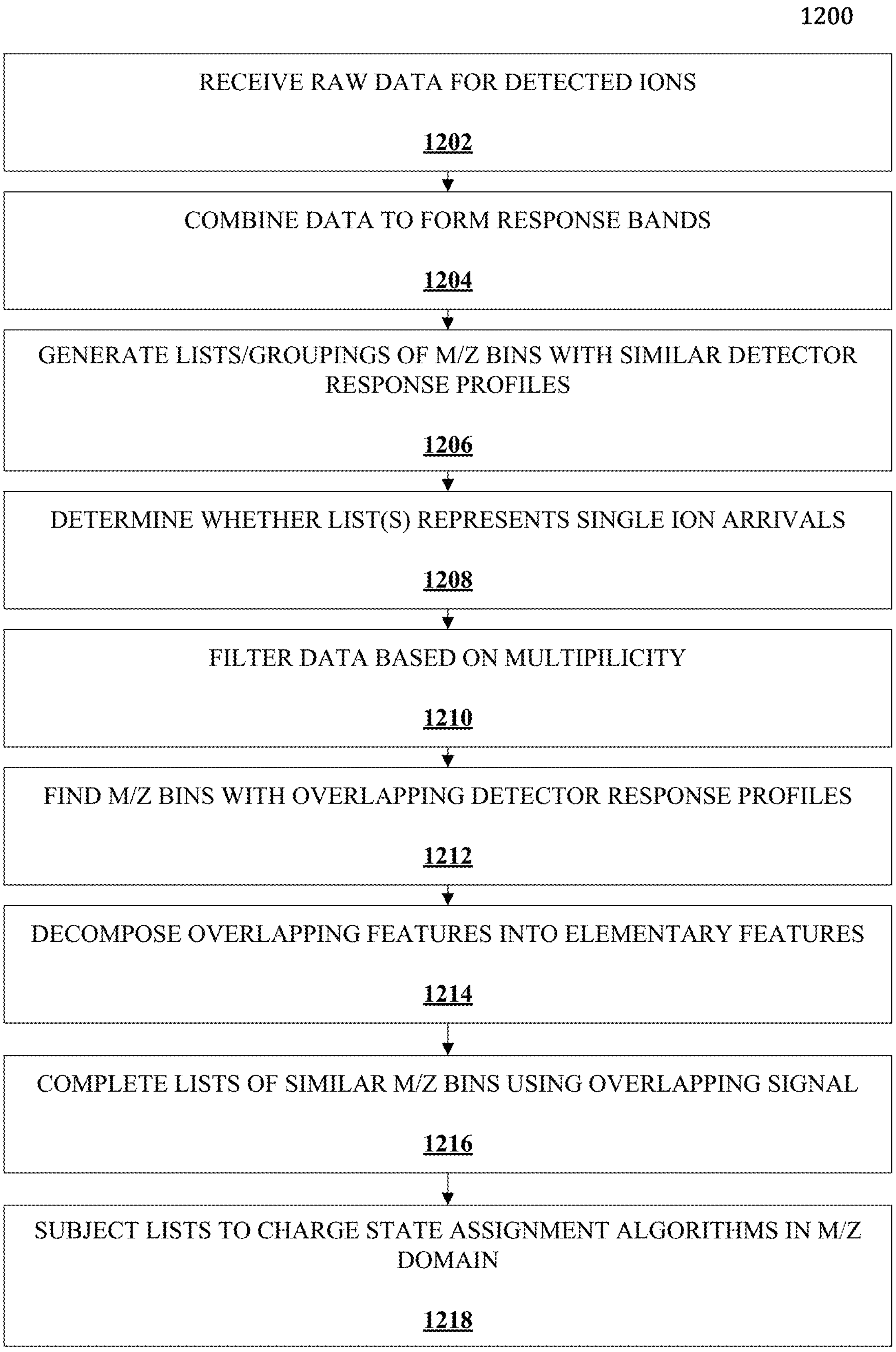
FIG. 12 depicts an example method for charge state assignment using detector response profiles.

FIG. 12 is another example method 1200 for charge state assignment using detector response profiles. In the example method 1200 of FIG. 12, the operations 1202-1206 are similar to operations 902-906 of method 900 depicted in FIG. 9 and described above. At operation 1208, a determination is made as to whether the groupings/lists represent single ion arrivals. For instance, the groups of m/z bins that represent single-ion arrival events may be identified. Such a determination or identification may be made by analyzing the characteristics of the corresponding detector response profile to determine if the detector response profile has characteristics more similar to a single arrival event (e.g., the detector response profile 802 in FIG. 8) or more similar to a multi-ion arrival (e.g., the detector response profile 804 in FIG. 8). Single ion arrivals and multiple ion arrivals also be distinguished by a simple examination of the frequency of observed detection events in the m/z bin. The process can be modeled using Poisson distribution and with simple calculation of 'no detection' occurrences for specific m/z bin, it is possible to calculate the frequencies of each ion multiplicity in the same bin. Such frequencies then can be used as an input to the grouping algorithms to help assign ions with different multiplicities to the same group of ions.

At operation 1210, the grouped m/z bins may be filtered or further grouped based on the multiplicity of ion detection events. For instance, the m/z bins with single ion events may be retained or filtered into a single-ion event category. The m/z bins with multi-ion events may then be removed or filtered into a multi-ion event category. Of note, the m/z bins with multi-ion events may be initially grouped together because their respective detector response profiles most closely match the detector response profiles of other m/z bins having multi-ion events.

In some examples, for the m/z bins having multi-ion events, the elementary detector response profile (e.g., the detector response profile if single-ion conditions occurred) may be generated or simulated. Such a generation of the elementary response profile may come from a stored library or database the stores correlations of elementary response profiles with multi-ion response profiles. Other techniques may also be performed to generate the elementary response profile. That generated elementary response profile may then be used for grouping/listing of the m/z bin. Thus, contributions from m/z bins having multi-ion events may still be utilized with m/z bins having single-ion events.

Operation 1212-1218 are then similar to operations 1110-1116 of method 1100 of FIG. 11 discussed above. Cases of overlapping features at a higher multiplicity may be resolved using a Bayesian framework, or other suitable technique.

The operations of the above methods in FIGS. 9-12 (among other operations described herein) maybe performed the systems and/or system components discussed herein, such as the systems in FIGS. 1-3. For example, operations may be performed by one or more processors according to instructions stored in memory.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for assigning charge state in mass spectrometry, the method comprising:

receiving a detector response signal corresponding to a plurality of ion arrival events, the detector response signal comprising information related to individual ion responses generated by a detector for each ion arrival event;

based on the detector response signal, generating detector response profiles for mass-to-charge (m/z) bins of a mass spectrum generated from the ion arrival events;

grouping the m/z bins into a plurality of groups based on a similarity of the detector response profiles of the m/z bins; and assigning a charge state to one or more features based on the groups of m/z bins.

2. The method of claim 1, further comprising generating a simplified mass spectra based on the groups of m/z bins, wherein the groups of m/z bins are indicated in the simplified mass spectra.

3. The method of claim 1, further comprising calculating a mass corresponding to the ion arrival events based on the assigned charge state.

4. The method of claim 1, wherein grouping the m/z bins is further based on additional separation domain data.

5. The method of claim 4, wherein the additional separation domain data includes at least one of retention time, drift time, or compensation voltage for ion mobility.

6. The method of claim 1, wherein grouping the m/z bins is performed using a principal component analysis (PCA), a k-means clustering algorithm, or a principal component variable grouping (PCVG) algorithm.

7. The method of claim 1, further comprising generating a representation of the ion arrival events, the representation having an m/z dimension, a detector response dimension, and an ion count or probability dimension.

8. The method of claim 7, wherein the representation is a heatmap.

9. The method of claim 7, wherein grouping the m/z bins is performed, at least in part, by applying a pattern recognition algorithm to the representation.

10. A system for assigning charge state in mass spectrometry, the system comprising:

a detector to configured to generate a detector response signal for each ion arrival event;

a processor; and a memory storing instructions that are configured to, when executed by the processor, cause the system to perform a set of operations comprising:

receiving, from the detector, the detector response signal corresponding to a plurality of ion arrival events, the detector response signal comprising information related to individual ion responses generated by the detector for each ion arrival event;

based on the detector response signal, generating detector response profiles for mass-to-charge (m/z) bins of a mass spectrum generated from the ion arrival events;

grouping the m/z bins into a plurality of groups based on a similarity of the detector response profiles of the m/z bins; and assigning a charge state to one or more features based on the groups of m/z bins.

11. The system of claim 10, wherein the operations further comprise generating a simplified mass spectra based on the groups of m/z bins, wherein the groups of m/z bins are indicated in the simplified mass spectra.

12. The system of claim 10, wherein grouping the m/z bins is further based on additional separation domain data.

13. The system of claim 12, wherein the additional separation domain data includes at least one of retention time, drift time, or compensation voltage for ion mobility.

14. The system of claim 10, wherein grouping the m/z bins is performed using a principal component analysis (PCA), a k-means clustering algorithm, or a principal component variable grouping (PCVG) algorithm.

15. The system of claim 10, further comprising generating a representation of the ion arrival events, the representation having an m/z dimension, a detector response dimension, and an ion count or probability dimension.

16. The system of claim 10, further comprising generating confidence scores for the groups, and wherein assigning the charge state is further based on at least one of the confidence scores.

17. A method for assigning charge state in mass spectrometry, the method comprising:

receiving a detector response signal corresponding to a plurality of ion arrival events, the detector response signal comprising information related to individual ion responses generated by a detector for each ion arrival event;

based on the detector response signal, generating detector response profiles for mass-to-charge (m/z) bins of a mass spectrum generated from the ion arrival events;

grouping the m/z bins into a plurality of groups based on a similarity of the detector response profiles of the m/z bins;

identifying m/z bins that represent single-ion arrival events; and assigning a charge state to one or more features based on the groups of m/z bins identified as having single-ion arrival events.

18. The method of claim 17, further comprising generating confidence scores for the groups, and wherein assigning the charge state is further based on at least one of the confidence scores.

19. The method of claim 17, wherein grouping the m/z bins is further based on additional separation domain data including at least one of retention time, drift time, or compensation voltage for ion mobility.

20. The method of claim 17, wherein identifying the m/z bins that represent single-ion arrival events is based on a frequency of observed detection events in the m/z bin.

* * * * *